United States Patent
Frasure et al.

(10) Patent No.: US 9,728,057 B2
(45) Date of Patent: Aug. 8, 2017

(54) PNEUMATIC DETECTION USING A LIQUEFIED COMPRESSED GAS

(71) Applicant: Kidde Technologies, Inc., Wilson, NC (US)

(72) Inventors: David Frasure, Wilson, NC (US); Harlan Hagge, Knightdale, NC (US); Steven Wallace, Raleigh, NC (US); Dharmendr Len Seebaluck, Wake Forest, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 539 days.

(21) Appl. No.: 14/287,969

(22) Filed: May 27, 2014

(65) Prior Publication Data

US 2015/0348386 A1    Dec. 3, 2015

(51) Int. Cl.
| | |
|---|---|
| *G01L 7/00* | (2006.01) |
| *G08B 17/04* | (2006.01) |
| *H01H 47/00* | (2006.01) |

(52) U.S. Cl.
CPC ............... *G08B 17/04* (2013.01); *G01L 7/00* (2013.01); *H01H 47/00* (2013.01); *Y10T 29/49828* (2015.01); *Y10T 307/779* (2015.04)

(58) Field of Classification Search
None
See application file for complete search history.

(56) References Cited

U.S. PATENT DOCUMENTS

| | | | |
|---|---|---|---|
| 2,831,091 A | 4/1958 | Lang | |
| 3,284,600 A | 11/1966 | Mertler | |
| 3,456,839 A * | 7/1969 | Glisenti | ............... A23G 9/166 |
| | | | 222/146.1 |
| 3,493,167 A * | 2/1970 | Wake | ............... F04D 27/0284 |
| | | | 417/22 |
| 4,059,994 A | 11/1977 | Annino et al. | |
| 4,073,183 A | 2/1978 | Byalko et al. | |
| 4,232,223 A | 11/1980 | Ohnishi et al. | |
| 4,234,999 A | 11/1980 | Winter et al. | |
| 4,256,964 A | 3/1981 | Ishida et al. | |
| 4,484,619 A * | 11/1984 | Franz | ............... B60H 1/3205 |
| | | | 165/202 |
| 4,584,746 A | 4/1986 | Tivolle et al. | |
| 4,711,571 A | 12/1987 | Schuman | |
| 4,984,501 A | 1/1991 | Roller | |
| 5,691,702 A | 11/1997 | Hay | |
| 7,227,642 B2 | 6/2007 | Oida et al. | |

FOREIGN PATENT DOCUMENTS

GB        1009885 A       11/1965

OTHER PUBLICATIONS

Extended European Search Report for EP Application No. 15169146.6-1810, dated Oct. 23, 2015, pp. 1-8.

* cited by examiner

*Primary Examiner* — Jared Fureman
*Assistant Examiner* — Aqeel Bukhari
(74) *Attorney, Agent, or Firm* — Cantor Colburn LLP

(57) ABSTRACT

A pneumatic detection system and a method of forming the pneumatic detection system are described. The system includes a sealed tube, a refrigerant disposed within the sealed tube, and a switch configured to be activated based on a specified pressure being reached within the sealed tube.

15 Claims, 4 Drawing Sheets

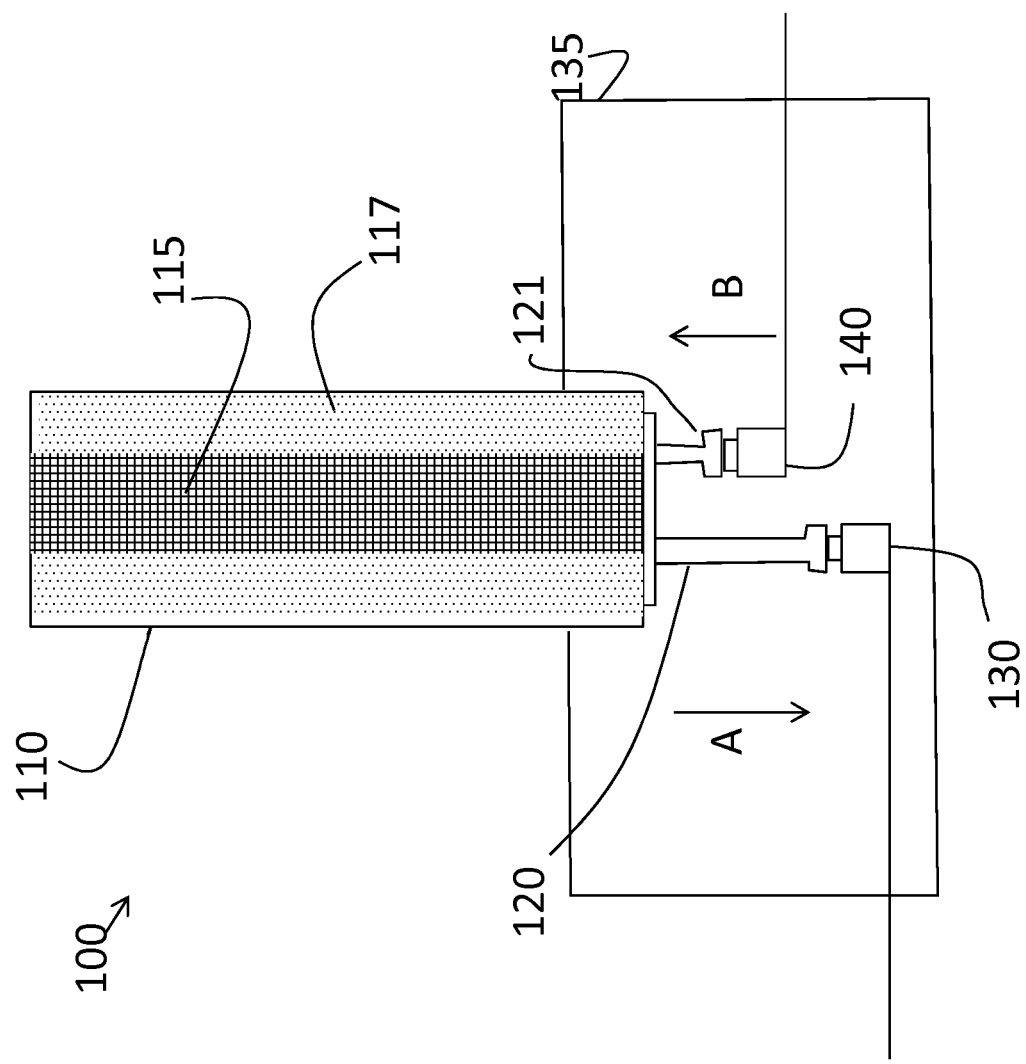

PNEUMATIC DETECTION USING A LIQUEFIED COMPRESSED GAS

BACKGROUND OF THE INVENTION

Exemplary embodiments pertain to the art of pneumatic detection.

Pneumatic detectors comprise a sealed tube that detects certain conditions based on a pressure increase within the tube. For example, a pneumatic detector may be used for fire detection which can be an important function in many environments such as in commercial, military ground, aircraft, and spacecraft. Fire detection using a pneumatic detector involves an increase in internal pressure within the sealed tube based on heat. When the pressure increases to a specified level, a switch may be activated based on an arrangement of the sealed tube with a switch activation mechanism.

BRIEF DESCRIPTION OF THE INVENTION

Disclosed is a pneumatic detection system including a sealed tube; a refrigerant disposed within the sealed tube; and a switch configured to be activated based on a specified pressure being reached within the sealed tube.

Also disclosed is a method of forming a pneumatic detection system including selecting a refrigerant; obtaining specifications including a first threshold temperature and first length of a sealed tube at which an alarm switch must be activated; determining a concentration of the refrigerant to dispose in a sealed tube based on the specifications; and arranging the alarm switch to be activated based on the specifications.

BRIEF DESCRIPTION OF THE DRAWINGS

The following descriptions should not be considered limiting in any way. With reference to the accompanying drawings, like elements are numbered alike:

FIGS. 1A, 1B, and 1C are block diagrams of different states of a pneumatic detection system according to embodiments of the invention.

DETAILED DESCRIPTION OF THE INVENTION

A detailed description of one or more embodiments of the disclosed apparatus and method are presented herein by way of exemplification and not limitation with reference to the Figures.

As noted above, pneumatic detectors operate on the basis of a pressure increase within a sealed tube. Pneumatic fire detection is one application for pneumatic detection in which heat causes the pressure increase. Some current pneumatic fire detectors use a metal hydride wire in a sealed tube with an inert gas to form the detector. Based on a temperature rise, internal pressure of the sealed tube may increase due to heating of the pressurized inert gas or the release of hydrogen gas from a section of the metal hydride wire that is subjected to high heat. The metal hydride wire may result from performing a hydride process on a titanium or vanadium wire. The hydriding process involves exposing the titanium or vanadium wire to high temperature and pressurized hydrogen gas, which the wire absorbs while cooling. The process of forming the metal hydride wire can be expensive. Embodiments of the system and method detailed herein relate to fabricating a pneumatic fire detection system that includes refrigerant rather than a metal hydride wire in the sealed tube. As described below, the embodiments involve an exponential pressure response to temperature increase.

Figure 1A:
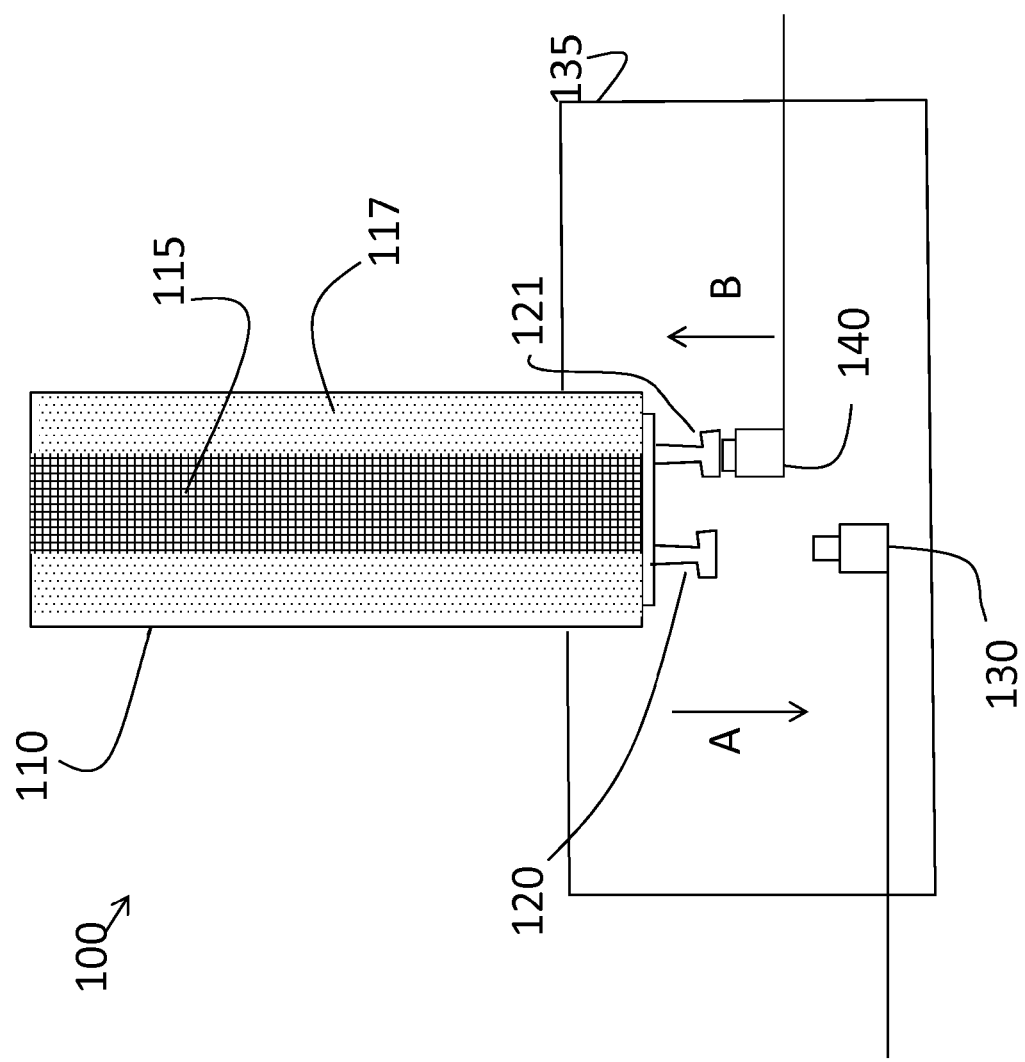

FIG. 1A is a block diagram of a default state of a pneumatic detection system 100 according to an embodiment of the invention. The pneumatic detection system 100 includes a sealed tube 110 holding a refrigerant 115 and, optionally, an inert gas 117, both of which are further discussed below. At one end of the sealed tube 110, diaphragms 120 and 121 are coupled to and extend from the sealed tube 110. In the embodiment shown in FIG. 1A, the diaphragms 120 and 121 extend into a housing 135 that includes switches 130, 140. As shown, the switches 130, 140 may each be connected to a larger system that functions on the basis, at least in part, of the pneumatic detection system 100 output. In alternate embodiments, the switches 130, 140 and the remaining system may be arranged differently but still in a way that the switches 130, 140 are activated as discussed here. As shown, the switch 130 is an alarm indicator, and the switch 140 is a fault indicator. In the initial state illustrated by FIG. 1A, based on their respective arrangement, the switch 140 is activated but the switch 130 is not. In this state, with the diaphragm 121 pushing down on the switch 140, the pneumatic detection system 100 has sufficient (default) pressure, which indicates that there is no fault.

FIG. 1B is a block diagram of an alarm state of the pneumatic detection system 100 according to an embodiment of the invention. When pressure within the sealed tube 110 increases, because some or all of the sealed tube 110 experiences an overheat or fire condition, the diaphragm 120 is pushed out (in the direction indicated by A). When the pressure within the sealed tube 110 reaches a specified level (according to the formation of the sealed tube 110 discussed below), the diaphragm 120 activates the switch 130 as shown in FIG. 1B. Based on the larger system to which the switch 130 is attached, the activation of the alarm switch 130 may result in some action to address the overheat condition or fire. When the overheat condition or fire is resolved and the refrigerant 115 temperature is returned to the default temperature, then the pneumatic detection system 100 returns to the default condition illustrated in FIG. 1A. That is, the diaphragm 120 disengages from the switch 130 but the diaphragm 121 remains engaged with the switch 140, indicating that pressure levels within the sealed tube 110 have returned to the default condition.

Figure 1C:
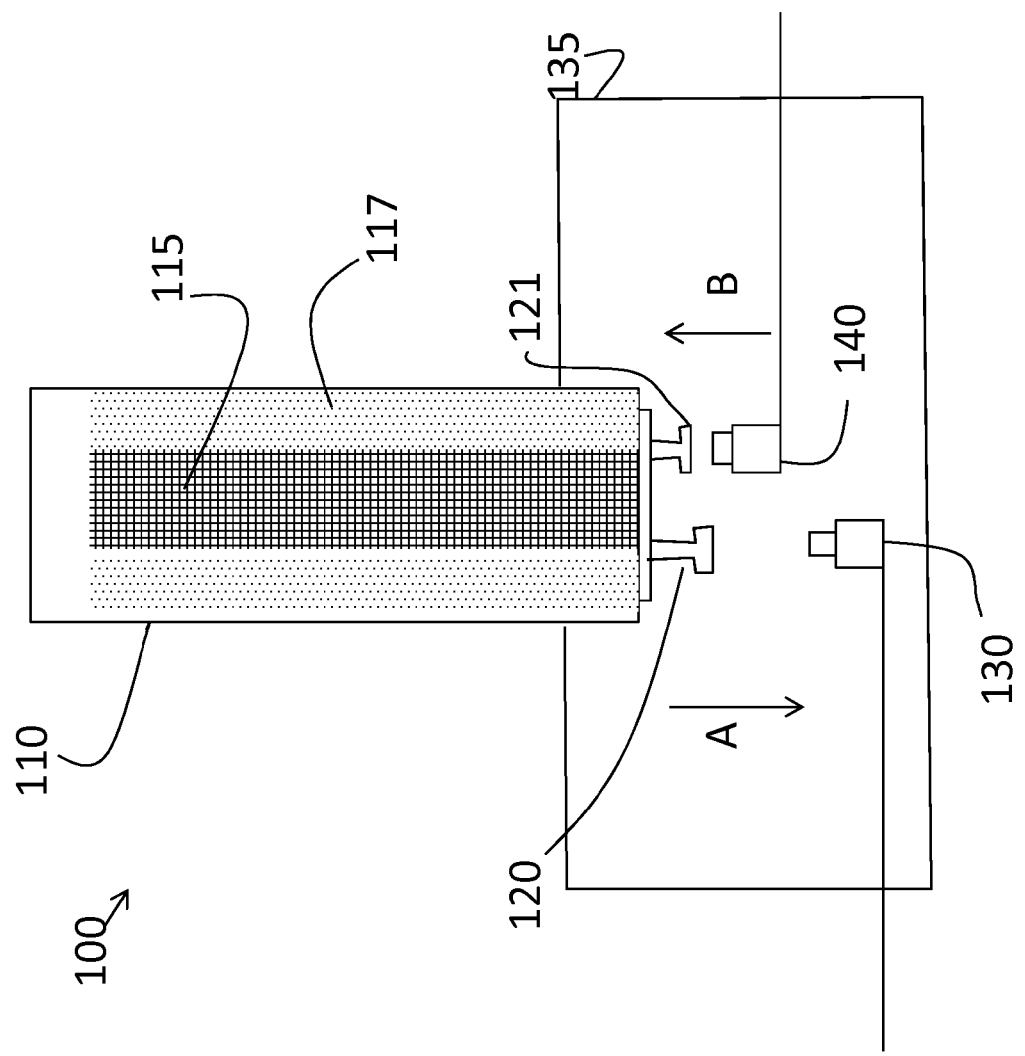

FIG. 1C is a block diagram of a fault condition of the pneumatic detection system 100 according to an embodiment of the invention. When a fault occurs (e.g., a leak in the sealed tube 110), then the pressure holding the diaphragm 121 in a default position (as shown in FIG. 1A) is released. As pressure continues to decrease, the diaphragm 121 moves (in the direction indicated by B) to deactivate switch 140. When the switch 140 is no longer engaged by the diaphragm 121, as shown in FIG. 1C, the larger system to which the switch 140 is coupled may address the fault condition based on a message to an operator, for example. The state shown in FIG. 1C is also indicative of the pneumatic detection system 100 prior to the default condition being established. That is, the state shown in FIG. 1C exists prior to filling and hermetically sealing the sealed tube 110. Once the sealed tube 110 is filled with the proper proportion of refrigerant 115 and (optionally) inert gas 117, as further discussed below, then the pneumatic detection system 100 moves from the state shown in FIG. 1C to the default state shown in FIG. 1A.

The formation of the sealed tube 110 and, specifically, the way that the concentration of refrigerant 115 and amount of inert gas 117 is determined is detailed further. The sealed tube 110 may be routed around various subsystems in an airplane environment, for example. The length of the sealed tube 110 may be ten feet or more in an exemplary case. For effective fire detection, the pneumatic detection system 100 must activate the switch 130 whether an overheat condition or a fire occurs over the entire length of the sealed tube 110 or at a small portion. As FIG. 1B indicates, an increase in pressure within the sealed tube 110 causes movement of the diaphragm 120 in the direction indicated by A, but a particular level of pressure is required for the diaphragm 120 to reach and activate the switch 130 to indicate an alarm. Thus, a fire over the entire length of the sealed tube 110 or at a small portion must both result in the same particular level of pressure required for the diaphragm 120 to activate the switch 130. Achieving the same particular level of pressure (over the entire sealed tube 110) requires a relatively larger pressure increase in a small area within the sealed tube 110 or a relatively smaller pressure increase over a large area within the sealed tube 110.

For explanatory purposes, two specifications for the pneumatic detection system 100 are discussed: (1) a first temperature over a first length and (2) a second temperature over a second length. The first temperature is relatively higher than the second temperature, and the first length is relatively shorter than the second length. Both the first temperature over the first length and the second temperature over the second length must generate the same pressure increase (same overall pressure within the sealed tube 110) in order for the switch 130 to be activated or triggered in either case. As noted above, this means that the first temperature over the first (shorter) length must result in a relatively higher (localized) pressure that is distributed over the sealed tube 110 than the second temperature over the second (longer) length. In this regard, a specific feature of the refrigerant 115 (e.g., liquefied compressed gas) facilitates the two exemplary specifications noted above. The feature of the refrigerant 115 is an exponential pressure response to temperature increase. This is dissimilar to the linear pressure response to temperature of a metal hydride wire, for example.

As a result of the exponential pressure response of the refrigerant 115, the pressure increase due to the first (higher) temperature over the first (shorter) length may be proportionately much larger than the pressure increase due to the second (lower) temperature over the second (longer) length. This proportionately larger pressure increase (originating over the first shorter length), when distributed over the entire length of the sealed tube 110 should, according to the specification, be sufficient to activate the switch 130. The proportionately smaller pressure increase (originating over the second longer length), should, according to the specification, also be sufficient to activate the switch 130. Based on the specified values for the first and second temperature and the first and second length (and, in alternate embodiments, additional specified temperature and length combinations), the (concentration) amount of the refrigerant 115 that will be homogenously distributed throughout the sealed tube 110 may be determined. That is, for example, the concentration of refrigerant 115 is determined according to the mass needed over the second (longer) length to generate the particular pressure needed to activate the switch 130 at the second (lower) temperature. Inert gas 117 (e.g., nitrogen) may be used, as needed, to adjust the pressure for a given temperature. Both the concentration of refrigerant 115 and the amount of inert gas 117 are calibrated or adjusted to result in a mixture that achieves the necessary pressure (sufficient pressure to activate the switch 130) for both the first (shorter) length at the first (higher) temperature and for the second (longer) length at the second (lower) temperature.

Figure 2:
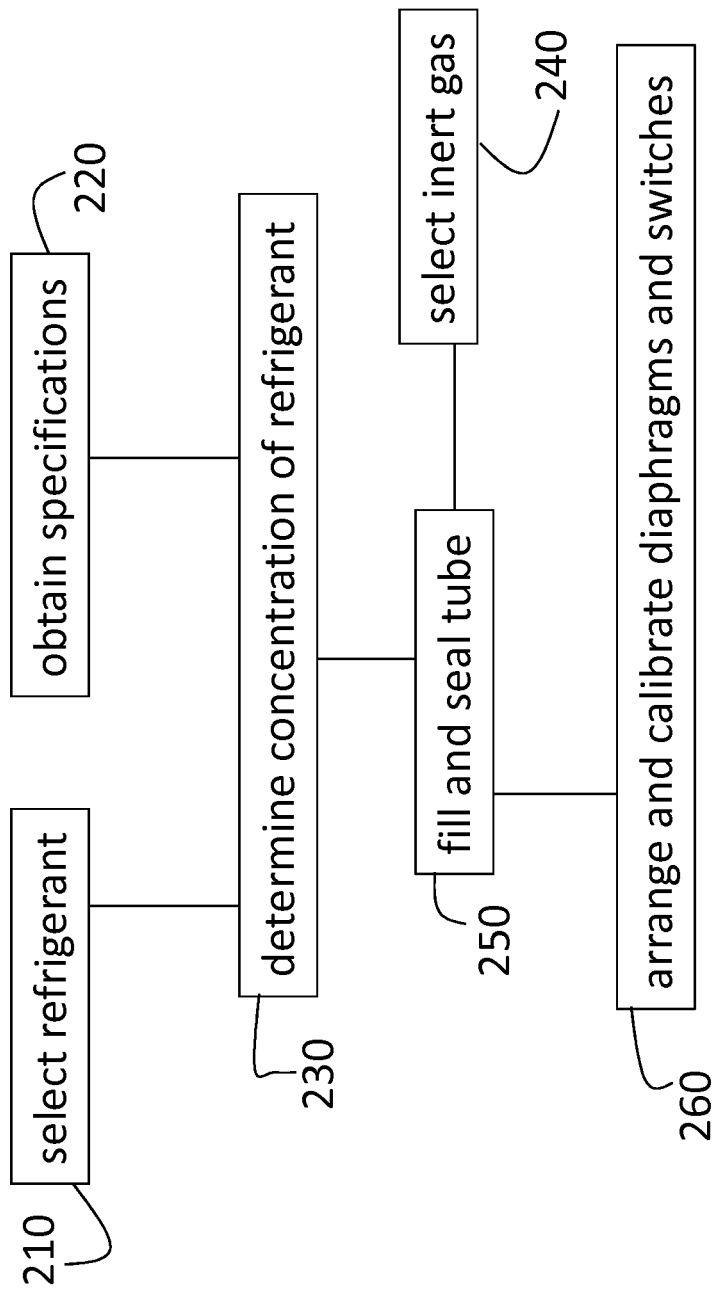
FIG. 2 is a process flow of a method of forming a pneumatic detection system according to embodiments of the invention.

FIG. 2 is a process flow of a method of forming a pneumatic detection system 100 according to embodiments of the invention. At block 210, selecting the refrigerant 115 may be based on the environment in which the pneumatic detection system 100 is intended to be used, for example. In an exemplary aviation application, the pneumatic detection system 100 is operational to −65 degrees Fahrenheit (° F.) or −54 degrees Centigrade (° C.). The refrigerant 115 remains in a gaseous state (above the refrigerant boiling point) at the lowest operational temperature requirements of the pneumatic detection system 100. In these cases, trifluoromethane or bromotrifluoromethane may be used as the refrigerant 115, for example. At block 220, obtaining specifications includes obtaining one or more sets of temperature threshold and corresponding length of the sealed tube 110 at which the switch 130 must be activated. Determining the concentration of refrigerant 115 at block 230 is as described above. Specifically, the concentration of refrigerant 115 is determined based on generating the same pressure within the entire sealed tube 110 (the pressure needed to activate the switch 130) for the specified sets of temperature and length. Based on the determined concentration of refrigerant 115, selecting an inert gas 117 at block 240 may be done optionally to fill the sealed tube 110. The process at block 250 includes filling and sealing to produce the sealed tube 110. Arranging and calibrating the diaphragms 120, 121 and switches 130, 140 at block 260 includes disposing each of those elements such that, for example, the diaphragm 120 reaches the proper position to activate the switch 130 as needed, and the diaphragm 121 disengages from the switch 140 when pressure within the sealed tube 110 decreases below a threshold.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A pneumatic detection system, comprising:
    a sealed tube;
    a refrigerant disposed within the sealed tube;
    a first switch configured to be activated until a fault condition is reached, the first switch being operated by a first diaphragm until the fault condition is reached indicating a drop in pressure from a default pressure; and
    a second switch configured to be activated based on a specified pressure being reached within the sealed tube, the second switch being operated by a second diaphragm when the specified pressure is reached.

2. The system according to claim 1, further comprising the second diaphragm coupled to the sealed tube configured to expand based on the specified pressure being reached within the sealed tube and to active the second switch.

3. The system according to claim 1, wherein the refrigerant has a concentration to reach the specified pressure when a first temperature is reached over a first length of the sealed tube.

4. The system according to claim 3, wherein the refrigerant has the concentration to reach the specified pressure when a second temperature, lower than the first temperature, is reached over a second length, longer than the first length, of the sealed tube.

5. The system according to claim 1, wherein the refrigerant exhibits an exponential increase in pressure based on temperature increase.

6. The system according to claim 1, wherein the refrigerant is a liquefied compressed gas.

7. The system according to claim 1, wherein the refrigerant is trifluoromethane or bromotrifluoromethane.

8. The system according to claim 1, further comprising an inert gas in the sealed tube.

9. A method of forming a pneumatic detection system, the method comprising:
selecting a refrigerant;
obtaining specifications including a first threshold temperature and first length of a sealed tube at which an alarm switch must be activated;
determining a concentration of the refrigerant to dispose in a sealed tube based on the specifications;
arranging a fault switch to be activated by a first diaphragm until pressure of the refrigerant falls below a default pressure; and
arranging the alarm switch to be activated by a second diaphragm based on the specifications.

10. The method according to claim 9, wherein the selecting the refrigerant is based on an environment in which the pneumatic detection system is to be used.

11. The method according to claim 9, wherein the selecting the refrigerant includes selecting the refrigerant that exhibits an exponential increase in the pressure based on temperature increase.

12. The method according to claim 9, wherein the selecting the refrigerant includes selecting a liquefied compressed gas.

13. The method according to claim 9, wherein the determining the concentration of the refrigerant is based on reaching a specified pressure over a full length of the sealed tube when the first length of the sealed tube reaches the first temperature, the specified pressure being a required pressure to activate the alarm switch.

14. The method according to claim 13, wherein the determining the concentration of the refrigerant is based on reaching the specified pressure when a second temperature, lower than the first temperature, is reached over a second length, longer than the first length, of the sealed tube.

15. The method according to claim 9, further comprising disposing inert gas as a filler in the sealed tube.

* * * * *